Patented July 5, 1927.

1,635,110

UNITED STATES PATENT OFFICE.

JOHN J. RUCKER BRISTOW, OF TAMPA SHORES, FLORIDA, ASSIGNOR TO JOHN W. BEACH, OF TAMPA, FLORIDA.

PAINT.

No Drawing.   Application filed February 8, 1926.   Serial No. 86,937.

This invention provides a paint or coating composition that, when applied to a surface, affords a water-proof or water-resistant coating of superior opacity. When mixed with water, it has superior covering characteristics, it is self priming, and it has the power of adhesion to metal, glass, stone, and any other material to which paint ordinarily is applied.

The composition includes kaolin (hydrous aluminum silicate) in comminuted state and preferably ground to pass through a 200-mesh screen, powdered or comminuted silicate of soda, commercial zinc oxide, and casein thoroughly mixed together.

Any suitable and desired coloring matter may be incorporated into the composition, and it has been found in practice that the color may be mixed with advantage with the kaolin before that ingredient is mixed with the other ingredients.

The ingredients preferably are used in approximately the following proportion by weight: kaolin, 62 parts; silicate of soda, 27 parts; zinc oxide, 7½ parts; casein, 3½ parts.

The proportions with which the ingredients may be incorporated into the composition may vary, within certain limitations, to meet different requirements, and it has been found in practice that the composition is susceptive of comparatively wide tolerances as to proportions without adversely affecting its characteristics as an efficient coating. Although it is not the intention to be limited to the exact variances stated, it has been found in practice that the composition having its ingredients mixed by weight in any of the following proportions affords a very satisfactory coating: kaolin, from 60 to 65 parts; silicate of soda, from 25 to 30 parts; zinc oxide, from 6 to 9 parts; casein, from 3 to 7 parts.

The composition is mixed with a sufficient quantity of hot or cold water to produce a free-flowing liquid paint, which so reacts in drying as to form a hard continuous coating.

Having thus described my invention, what I claim as new, and desire to secure by Letters Patent, is—

1. A coating composition comprising the following ingredients mixed together in approximately the proportions stated by weight: kaolin, from 60 to 65 parts; silicate of soda, from 25 to 30 parts; zinc oxide, from 6 to 9 parts; casein, from 3 to 7 parts.

2. A coating composition comprising the following ingredients mixed together in approximately the proportions stated by weight: kaolin, 62 parts; silicate of soda, 27 parts; zinc oxide, 7½ parts; casein, 3½ parts.

In witness whereof, I affix my signature.

JOHN J. RUCKER BRISTOW.